May 8, 1962     H. W. B. GARDINER     3,033,346
MACHINES SUITABLE FOR USE IN MASS PRODUCTION PROCESSES
Filed Feb. 21, 1957                             3 Sheets-Sheet 1
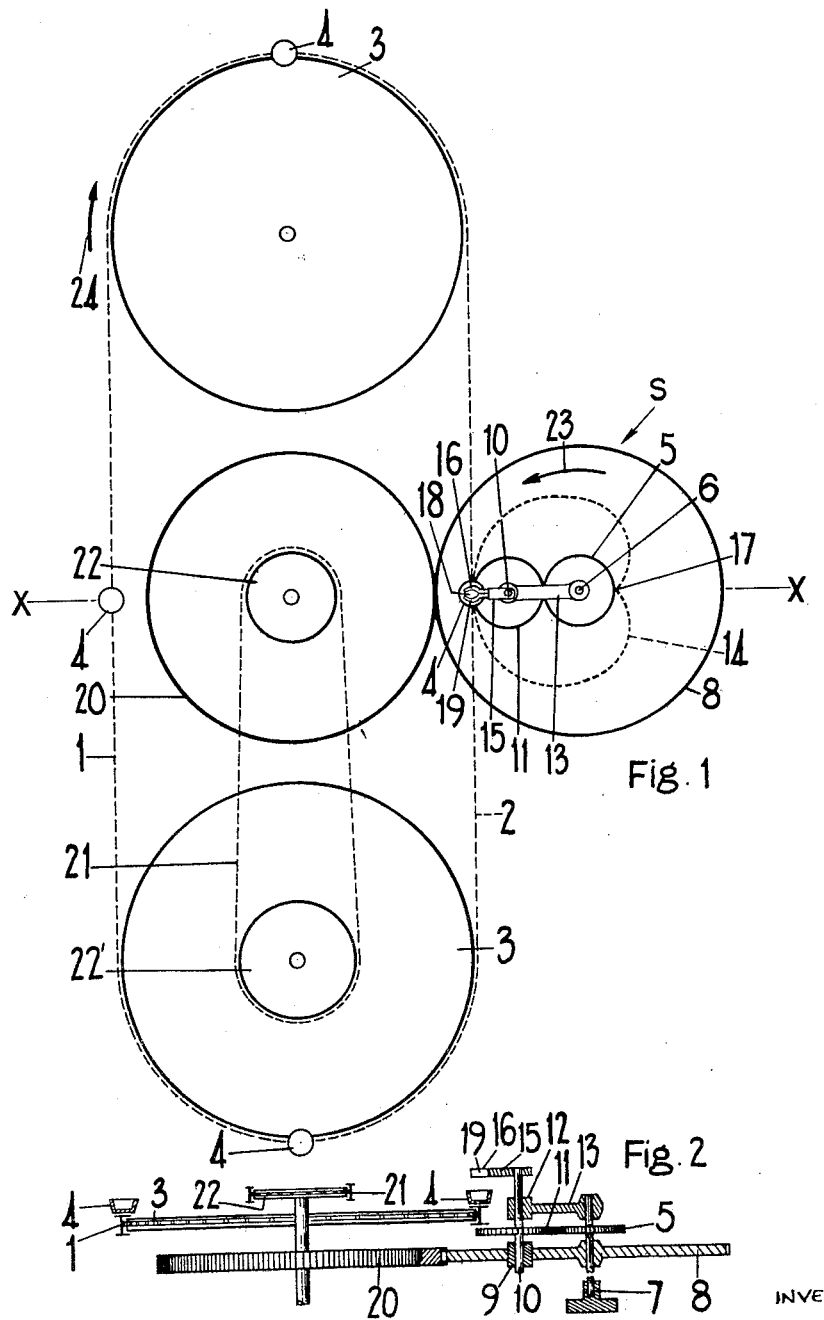
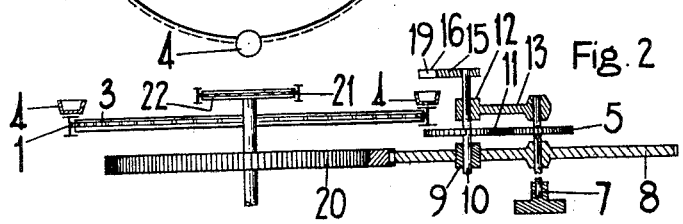
INVENTOR
HERBERT WILLIAM BENJAMIN GARDINER
BY
ATTORNEYS

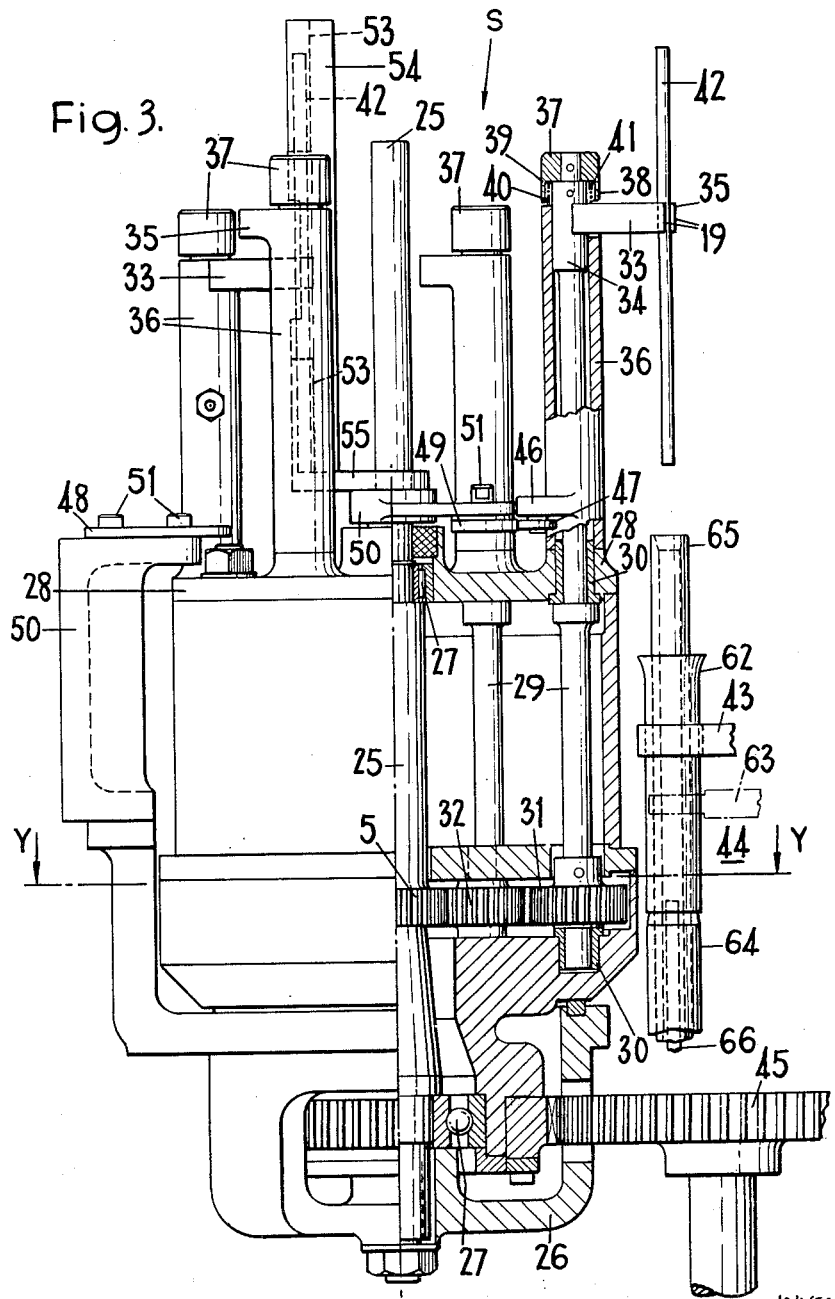

May 8, 1962  H. W. B. GARDINER  3,033,346
MACHINES SUITABLE FOR USE IN MASS PRODUCTION PROCESSES
Filed Feb. 21, 1957  3 Sheets-Sheet 3
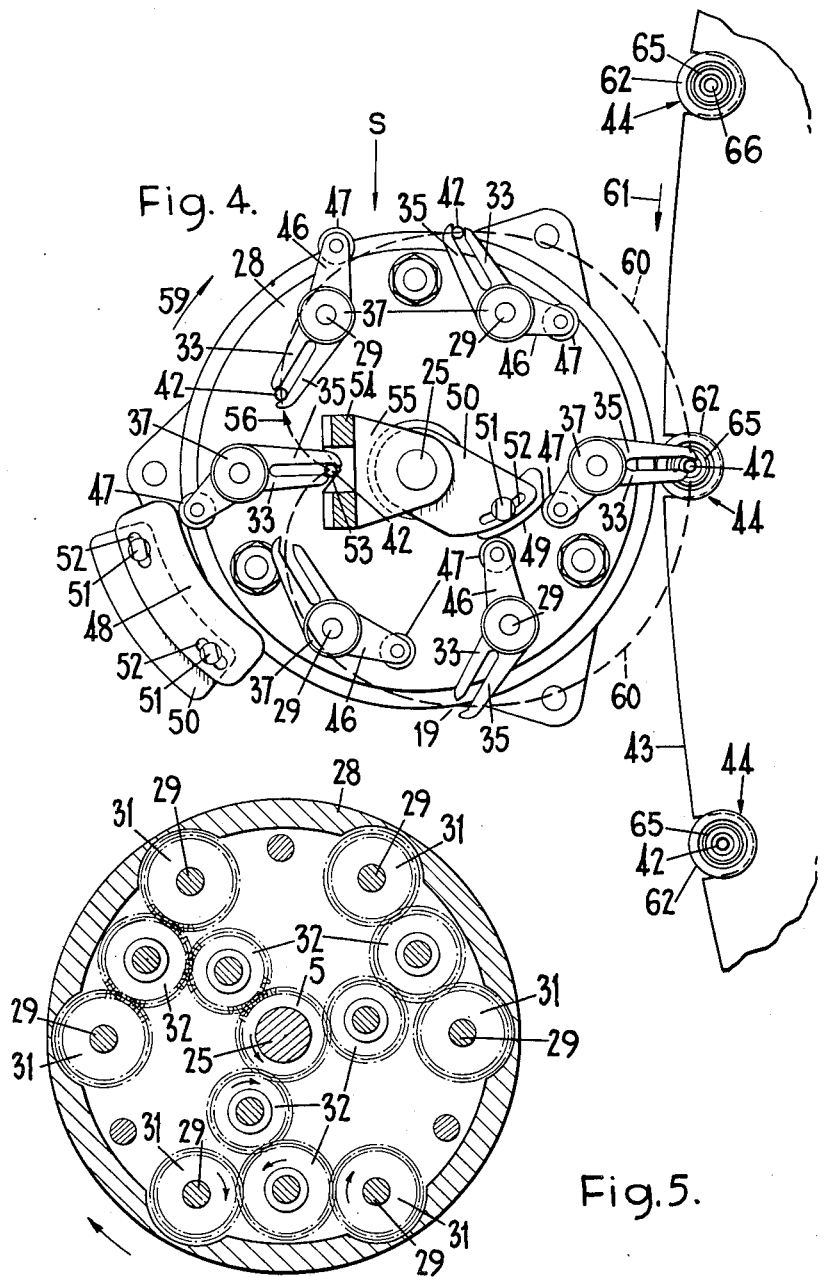

3,033,346
MACHINES SUITABLE FOR USE IN MASS PRODUCTION PROCESSES

Herbert William Benjamin Gardiner, Hatch End, England, assignor to The General Electric Company Limited, London, England
Filed Feb. 21, 1957, Ser. No. 641,690
Claims priority, application Great Britain Feb. 23, 1956
6 Claims. (Cl. 198—76)

This invention relates to machines suitable for use in mass production processes and of the kind including a main member arranged to travel along a main path and a secondary member arranged to travel along a secondry path which approaches or coincides with said main path at at least one working point of the latter for the performance at that point of an action involving co-operation between parts carried respectively by the main member and the secondary member.

The invention is especially, though not exclusively, concerned with machines of this kind used for the mass production of incandescent filament lamps. In such machines as at present used, the main member is arranged to move discontinuously between separate working points at which one or more of the components which go to make up the lamp are fed on to the main member, or an operation is carried out on components carried by the main member, the latter being held stationary at each working point. Such intermittent movement of the main member is usually referred to as "indexing."

One of the principal reasons for causing the main member to index in this way is to facilitate the loading of components on to or their removal from the main member by a secondary member as aforesaid, or the performance of operations on already loaded components, the tools for performing which operations are carried by a secondary member as aforesaid. The starting and stopping of the machinery involved in such indexing has, however, many disadvantages; thus, the accelerating and retarding of relatively massive machine members is not easy to effect smoothly, involves considerable waste of energy, and renders the operative parts liable to rapid wear. These difficulties increase as the required speed of operation of the machinery increases, and in most cases they limit the speeds at which the machine can be operated.

One way of avoiding or reducing these difficulties would be to cause the main member to move continuously at a constant speed, but this gives rise to difficulties with regard to the secondary member. Thus whilst for some purposes an associated secondary member can be arranged to move at a constant speed for co-operation with the main member at the same velocity at the working point, for example carrying round in a cyclic path tools which are arranged to be brought into co-operation successively with components on the main member and to travel with said components for a limited distance at the same velocity whilst performing an operation thereon, for other purposes it is necessary for the secondary member to move between a position of rest and a position at a working point on the path of the main member at which its velocity is the same as that of the main member. Here and elsewhere in this specification the expression "the same velocity" implies the same direction of motion as well as equal speed. For example it is often necessary to arrange for components to be loaded from a stationary position on to the secondary member whilst the latter is at rest, and then transferred to the main member at a working point thereof after being accelerated by the secondary member to the same velocity as the main member so as to be relatively at rest thereto. Conversely it is often required to transfer articles from a moving main member on to a secondary member moving with the same velocity at the working point and to unload the articles from the secondary member after the latter has retarded the articles to rest. As another instance it might be required to perform an operation on a tool carried by the secondary member whilst the tool is stationary, the tool being then accelerated by the secondary member to the velocity of the main member at a working point thereof for co-operating with components carried by the main member, and subsequently retarded by the secondary member to a stationary position for the repeating of said operation, which might be, for example, the inking of a printing tool.

The accelerations and retardations required to be effected by the secondary member could be produced by an indexing action or a reciprocating motion of parts carrying the secondary member, but this would again involve the disadvantages aforementioned, and the main object of this invention is to provide an arrangement which can be designed to produce the required motion of the secondary member by the use of supporting parts driven at a constant speed.

According to the invention, in a machine for use in a mass production process in which a secondary member has to be accelerated repeatedly from a rest position into a position of cooperation with a moving main member and at which latter position an action is arranged to be effected between parts carried by said members, there is included a main conveyor carrying the main member, means for driving the main conveyor continuously at a uniform speed, a secondary conveyor adjacent to the main conveyor and incorporating a bearing mounted on a movable support member and rotatably supporting a carrier member to which the secondary member is fixed at a point offset from the bearing axis, means for rotating the carrier member continuously at a uniform angular velocity about the bearing axis, and means for driving the secondary conveyor continuously at a uniform speed so that said bearing repeatedly traverses a closed path in a direction perpendicular to the bearing axis and the secondary member is thereby caused repeatedly to follow a working path having at least one cusp position at which the secondary member is instantaneously at rest and at least one other position at which the secondary member is moving in cooperation with and at the same velocity as the main member.

Preferably the support member carrying said bearing is mounted for rotation about a fixed axis lying parallel to, but offset from, the bearing axis, and the driving means is arranged to rotate the support member about the fixed axis at a uniform angular velocity so that the secondary member is caused to follow an epicyclic path having at least one cusp position at which the secondary member is instantaneously travelling at zero velocity.

It will be understood that the expression "epicyclic path" as employed in this specification and in the appended claims includes paths in the forms of hypocycloids as well as epicycloids.

The secondary member conveniently includes a fixed gear wheel and the carrier member consists of a rotatable gear wheel on which the secondary member is mounted and which is carried by the support member, the latter being rotatable about the axis of the fixed gear wheel and the rotatable gear wheel being coupled to the fixed gear wheel so as to be driven thereby when the support member is rotated about said axis for causing the secondary member to follow an epicyclic path.

Thus in a simple form of such an epicyclic gear system the said rotatable gear wheel may be arranged to engage directly with the fixed gear wheel, the secondary member being attached to, so as to be rotatable with, the second gear wheel and being arranged at the same distance from the axis of the wheel as the pitch line thereof. However, other forms of gearing for obtaining the required epicyclic path of the secondary member can be employed if desired. For example it might in some cases be convenient to include one or more idler gear wheels between the fixed gear wheel and the rotatable gear wheel.

The secondary member may be arranged to have only a single position of instantaneous zero velocity, although in some cases it may be arranged to have more than one such position, depending upon the particular gearing arrangements employed. For ensuring that the cusp(s) of the epicyclic path followed by the secondary member are always in the same position relatively to the fixed gear wheel, the number of teeth on the fixed gear wheel should, of course, be the same as or an exact multiple of the number of teeth on the rotatable wheel. In some cases the rotatable gear wheel may be arranged to rotate within the circumference of and engage directly with the fixed wheel; where the rotatable wheel is half the diameter of the fixed wheel in this latter arrangement the epicyclic path followed by the secondary member, will, of course, be a straight line, the cusp positions being at the two ends of the line.

If desired a plurality of rotatable gear wheels each carrying a said secondary member, and arranged to co-operate with a single fixed gear wheel, can be employed, or alternatively a single rotatable gear wheel may carry two or more secondary members. However, the closed path traced by the point about which the secondary member is constrained to rotate need not necessarily be circular, but may have any other convenient shape such that the working path of the secondary member has one or more cusp positions at which the secondary member is instantaneously travelling at zero velocity in use of the machine. For example, the closed path may have one or more straight regions, the arrangement being such that as the secondary member is carried along a said straight region it follows a substantially cycloidal path.

In the form of the invention at present particularly contemplated for use, the operation to be performed at the zero velocity position of the secondary member is the loading of an article, such as a lamp component, on to the secondary member, and the action to be performed at the working point of the main member is the unloading of this article on or in to a holder carried by the main member, but it will be appreciated that many other different operations and actions can be arranged to be effected.

Usually the main member of a machine of the kind with which this invention is concerned will be arranged to move in a cyclic path, and is preferably arranged to be rotated about a fixed axis at a constant angular velocity. The main and secondary members can be arranged to be carried by parts driven continuously in synchronism from the same prime mover by suitable gearing. Alternatively the secondary member and main member can be carried by parts driven from separate prime movers, with suitable synchronising arrangements if necessary, and in either case the required motion of said members can be obtained by the use of supporting parts driven at a constant speed. Machines in accordance with the invention may include a plurality of spaced groups of one or more secondary members with the different secondary member groups arranged to perform different functions and each arranged to co-operate with a single main member, at different working points in the path thereof.

Thus one secondary member group might be arranged to transfer objects or materials on to the main member at one working position and another secondary member group be arranged to transfer the processed objects or materials from the main member at a subsequent working position. Additional secondary member groups may be arranged to perform particular manufacturing operations on the objects or materials between the two transfer positions.

Such an arrangement may be employed, for example, in the manufacture of electric incandescent lamps for the assembly of different parts of a lamp envelope, such as the main bulb portion and the pinch carrying the filament; the pinch might, for example, be mounted on the main member, being the main conveyor of the machine, and the bulb placed in sealing relationship with the pinch by a secondary member, means being provided at a subsequent point along the main conveyor for sealing the pinch to the bulb portion.

For carrying out an assembly process of the kind referred to two or more spaced secondary member groups in accordance with the invention might be employed, the first being used for loading one of the component parts on to the main conveyor and the other secondary member group being used for placing one or more further components parts on the main conveyor in a predetermined position relatively to the first.

The invention will now be further explained by describing by way of example with reference to FIGURES 1 to 5 of the accompanying drawings two machines in accordance with the invention, both of which include a continuously moving main conveyor and a transfer arrangement for transferring articles from a rest position to the main conveyor in use of the machine.

In the drawings—

FIGURE 1 represents schematically a plan view of simple machine including as part of the transfer arrangement a single secondary member arranged to pick up articles from the said rest position and deposit them in suitable containers carried by the main conveyor, FIGURE 2 represents a transverse section through the same part of the machine across the line XX of FIGURE 1, FIGURE 3 represents a side elevation in part section of the transfer arrangement of the second machine for use in the manufacture of electric incandescent lamps, the transfer arrangement having six secondary members suitable for transferring the exhaust tubes of the lamps from a rest position to appropriate supports on the main conveyor;

FIGURE 4 represents a plan view of the transfer arrangement of this second machine, and FIGURE 5 represents a plan section of part of the transfer arrangement through the plane YY of FIGURE 3.

Referring to FIGURES 1 and 2 of the drawings the machine shown therein includes a continuously moving main conveyor 1 in the form of an endless chain 2 arranged to revolve in a horizontal plane and carried between two sprockets 3 rotatable about vertical axes, supports 4 for the articles, each of which constitutes a main member of the arrangement, the supports being spaced symmetrically around the chain as shown in FIGURE 1.

The transfer arrangement employed for transferring the articles from a position of rest to any one of the supports 4 on the main conveyor, and which includes the secondary member as aforesaid, comprises a secondary conveyor S incorporating a fixed gear wheel 5 mounted with its axis vertical by means of a spindle 6, the spindle being itself supported at its lower end by a suitable mounting 7.

Rotatable about the spindle 6 below the fixed gear wheel 5 is a support member in the form of a further gear wheel 8 having a diameter four times greater than that of the wheel 5, the wheel 8 carrying, at a distance from the centre equal to the diameter of the wheel 5, a bearing 9 (see FIGURE 2) which supports the lower end of a spindle 10 of a third gear wheel 11 having the same size and number of teeth as the gear wheel 5, the spindle 10 also being supported within a bearing 12 of a radius arm 13, located above the fixed gear wheel 5, and arranged to rotate with the wheel 8 about the spindle 6.

The gear wheel 11, which provides the carrier member aforesaid, engages with the fixed gear wheel 5 and constitutes a planet wheel which is arranged to revolve about the wheel 5 as the larger wheel 8 and the radius arm 13 are rotated, and to rotate simultaneously about its own axis, one revolution of the gear wheel 11 about its own axis taking place in a single rotation of the wheel 8. Thus any point in the pitch line of the gear wheel 11 will follow an epicyclic path in the form indicated by the broken line 14 in FIGURE 1.

Attached to the top of the spindle 10 so as to be rotatable with it and with the gear wheel 11 is a horizontally extending arm 15, this arm carrying at its outer end the secondary member 16 for feeding the articles on to the main conveyor, the part of the secondary member which carries the articles being located directly above the pitch line of the gear wheel 11 so that in operation this part of the device follows an epicyclic path having a position 17 of instantaneous zero velocity opposite to a position 18 of maximum velocity. The secondary member may be formed in any convenient manner depending on the shape of the article which it is adapted to carry and is shown consisting of a pair of co-operating jaws 19 arranged to grip the article between them during the transfer process.

The transfer arrangement is so arranged relatively to the main conveyor that the position 18 of maximum velocity of the secondary member 16 is immediately above part of the conveyor chain 2, and the speed of rotation of the gear wheel 11 of the transfer arrangement is such that at this point the member 16 is instantaneously travelling in the same direction and at the same speed as the adjacent part of the chain 2. This may be achieved by a suitable gearing between the conveyor and the transfer arrangement, for example by means of a gear wheel 20 arranged to engage with the gear wheel 8 of the transfer arrangement and connected to one of the sprockets 3 of the conveyor by means of a chain 21 and sprockets 22 and 22'.

In operation of the machine the articles which are required to be loaded on to the conveyor are arranged to be fed into the jaws 19 of the member 16 in the position of instantaneous zero velocity, this being effected either manually or by automatic means as may be desired. After an article has been fed to the member 16, the member and the article carried by it follow the epicyclic path indicated by the arrow 23, until they reach a position of maximum velocity immediately over the conveyor chain 2 which is travelling in the direction indicated by the arrow 24. When the member and the article are in this position it is arranged, by a suitable arrangement of the supports 4 on the main conveyor, that the article is immediately over one of the supports 4 and travelling at the same velocity, the article being released by the jaws of the member 16 at this or a slightly earlier instant, depending on the distance the article has to drop, and the speeds at which the conveyor and the secondary member are moving, and being thereafter carried by the said support 4 on the main conveyor.

Thus the pair of co-operating jaws 19 as aforesaid may be arranged to close on to a said article fed into it in the position of instantaneous zero velocity, the jaws opening at the position of maximum velocity and allowing the article to drop into the conveyor support 4 whilst the jaws and the conveyor support are instantaneously travelling at the same speed. The operation of the jaws 19 in such an arrangement can be arranged to take place automatically as the arm 15 is rotated, for example through a suitable system of cams such as shown in FIGS. 3 and 4; such a system can readily be devised in practice and has been omitted from the drawing for simplicity.

In some cases the transfer arrangement may be employed for assembling different parts of a lamp, one part being previously loaded onto the conveyor, and the other part being carried from a rest position by the secondary member and placed in a predetermined position relatively to said first part on the moving conveyor. For example the arrangement may be employed for mounting the pinches carrying the lamp filaments within the lamp bulbs, the pinches being loaded into the supports of the main conveyor at a position prior to the transfer arrangement and the latter being employed to pick up the bulbs from the position of rest and place one over each of the pinches, means being provided on the machine for subsequently sealing the pinches to the bulbs.

A similar arrangement to that already described may also be employed for loading the pinches on to the main conveyor if desired. In some cases a machine substantially as described by way of example may include a similar form of transfer arrangement for removing the lamp components from the continuously moving main conveyor after the completion of their treatment on the conveyor, the secondary member of the further transfer arrangement being arranged to remove the components from the conveyor whilst travelling at the same speed as the conveyor, and releasing them in a position at which the components are instantaneously at rest.

If desired one or more additional secondary members may also be employed for carrying out particular manufacturing operations on the components before they are removed from the main conveyor. For example, where the machine is employed for the complete assembly of all the lamp components, different secondary members might be arranged to carry out the different steps in the manufacture of the lamps, the members being suitably constructed for performing their particular functions. A further secondary member might be used for stamping insignia, for example a number or design, on the completed lamps before they are removed from the main conveyor, and might consist of a suitably designed pad arranged to pick up a quantity of ink or the like at a position of instantaneous zero velocity and print the insignia on a lamp whilst instantaneously travelling along with the lamp on the conveyor with the same velocity.

It will be appreciated that the main conveyor need not necessarily be of the chain type but may consist of a continuously rotating table onto which the components are required to be loaded, and that a different system of gear wheels may alternatively be employed to give the same epicyclic movement of the secondary member or members.

One such arrangement is illustrated in part in FIGURES 3 to 5 of the accompanying drawings.

Thus referring to these figures the transfer arrangement of the second machine constitutes a secondary conveyor S which comprises a single fixed gear wheel 5 as in the machine already described, mounted on a vertical shaft 25 which extends upwards from a fixed support 26. Surrounding the shaft 25 and supported therefrom at the top and bottom by suitable bearings 27 is a hollow second support 28, i.e., a movable support member, which is rotatable about the shaft 25 and which carries six further vertical shafts 29 constituting carrier members spaced uniformly around the fixed support 25 and equidistant from it. These further shafts 29 are mounted in suitable bearings 30 carried by the rotatable support 28 so that they can rotate with respect to the support, and each has attached to it a further gear wheel 31 of the same diameter as the fixed gear wheel 5 and connected to the fixed gear wheel through a pair of idler gear wheels 32 (see FIGURE 5), the gear wheels 31 constituting carrier members of the arrangement. Each pair of idler gear wheels 32 is common to an adjacent pair of the rotatable gear wheels 31 and the arrangement is such that each time the support 28, which provides the secondary conveyor of the machine, is rotated once about the fixed shaft 25 each of the gear wheels 31 and the shaft 29 to which it is attached make one revolution about their common axis.

Each of the shafts 29 extends upwards from the rotatable support 28 and carries at its upper end a pair of jaws 19 constituting secondary article-supporting means, which jaws extend radially outwards therefrom and provide a said secondary member of the machine. One jaw 33 of each pair is mounted directly on the corresponding shaft 29, the shaft passing coaxially through, and being secured to, a cylindrical boss 34 which forms the base of the jaw 33 and from which the jaw itself projects. The other jaw 35 of each pair extends radially outwards from the top of a cylindrical sleeve 36 which surrounds the respective shaft 29 and whose height is such that the two jaws 33, 35 are aligned in a horizontal plane, the jaw 33 which is attached to the shaft 29 passing through a slot formed in the wall of the sleeve. The top of each shaft 29 protrudes beyond the top of the surrounding sleeve 36 and has attached to it a metal cap 37 of the same external diameter as the sleeve and having a cylindrical skirt 38 extending downwards so that it nearly touches the top of the sleeve. The skirt 38 surrounds the upper part of the boss 34 which also protrudes beyond the top of the sleeve 36, and within the annular gap between the skirt 38 and the boss 34 is fitted a helical spring 39. One end of the spring is attached to a pin 40 projecting upwards into the gap from the top of the sleeve and the other end of the spring is attached to a similar pin 41 projecting downwards into the gap from the cap itself; the pressure of the spring on these pins is arranged to act in such a direction that it biases the jaws 33, 35 to the closed position.

Each pair of jaws 19 is shaped so as to be able to grip and hold in the vertical position the exhaust tube 42 of an electric incandescent lamp, and the jaws extend for such a distance from the shaft 29 that as the support 28 rotates in the direction indicated by the arrow 59 in FIGURE 4 the parts of the jaws which are adapted to grip a said exhaust tube 42 follow an epicyclic path shown by the broken line 60 in a similar manner to the jaws of the machine described with reference to FIGURES 1 and 2. The jaws are arranged to pick up an exhaust tube at a position of instantaneous zero velocity (that is to say at the cusp of the epicyclic path) and to transfer it to a suitable support 44 carried by a main conveyor 43 (only part of which is shown) when travelling instantaneously at the same speed as the support on the main conveyor. The main conveyor in this case consists of a continuously rotatable table arranged to rotate about a vertical axis in the direction of the arrow 61 in FIGURE 4, with the supports 44 uniformly spaced around it in such positions that one is ready to receive a said exhaust tube 42 when the tube is released by a co-operating pair of jaws 19 of the transfer arrangement.

The support 44 is also adapted to carry a lamp stem 62, which may be placed on the support before the latter reaches the said transfer arrangement and at which position it is arranged to receive an exhaust tube, the construction of the support being such that it holds a said exhaust tube and lamp stem when mounted on it in predetermined relative positions ready for subsequent sealing together. The actual construction of the support 44 is not relevant to the present invention but may, as shown in FIGURE 3, consist of a pair of jaws 63, for holding a lamp stem 62 with its axis vertical and with its lower end resting on an axial positioning member 64 in the form of a vertical hollow cylinder, and a central tube 65 which extends upwards from the positioning member through the said lamp stem, when the latter is carried by the support. The bore of the central tube 65 is of such a diameter that a said exhaust tube just fits within it. The tube 65 and a further positioning member 66 within the bore of the tube 65, which tube and member constitute a main article supporting means, are arranged to receive and support the exhaust tube 42 when the latter is deposited on the main conveyor by the jaws 19.

The support may also include means for supporting other parts of the lamp, for example the filament supports, but such means have been omitted from the drawing for simplicity.

The main conveyor 43 is geared to the rotatable support 28 through a suitable system of gearing, shown partly at 45, for enabling them to rotate at the appropriate speeds in use of the machine. For actuating the jaws 19 of the transfer arrangement so as to cause them to pick up and release the exhause tubes 42 at the required instants, there extends horizontally from the bottom of each sleeve 36 a radial arm 46 carrying a roller 47, rotatable about a vertical axis and arranged to engage two cam plates 48, 49 at appropriate positions during each revolution of the rotatable support, the engagement of the rollers with the cam plates causing the sleeve to be rotated about the shaft 29 on which it is fitted against the bias of the spring 39 and so opening the jaws 19.

Thus referring to FIGURE 4, the first cam plate 48 is so disposed that it engages the roller 47 of each sleeve just before the pick-up position so as to open the jaws 19. At the pick-up position itself the roller 47 leaves the cam plate 48 which allows the jaws to close and grip an exhaust tube which is arranged to be supported in this position with its axis vertical. The jaws 19 are then held closed by the spring 39 until they reach the transfer position at which the tube 42 is required to be deposited on a support 44 of the main conveyor 43.

In this position the roller 47 engages the second cam plate 49, so causing the jaws 19 to open and release the tube 42 and allow it to drop into the co-operating support 44 of the main conveyor.

Each cam plate 48, 49 is adjustably secured to a respective support 50 by means of studs 51. Thus slots 52 are provided in the plate 48, the studs passing through these slots 52 into tapped holes in the corresponding support 50.

Similarly a slot 52 is provided in the support 50 which carries the cam plate 49 a stud 51 passing through this slot and into a tapped hole in the cam plate 49 itself. The slots 52 enable the positions of the cam plates 48, 49 to be adjusted for varying the instants at which each pair of jaws 19 opens and closes in each cycle of operations of the transfer arrangement.

For preventing the jaws fouling each other as they rotate in use of the transfer arrangement alternate jaws are arranged at different heights as shown in FIGURE 3.

The exhaust tubes 42 which are to be transferred to the main conveyor 43 by the jaws 19 are arranged to be fed to the pick-up position one at a time by any suitable feed mechanism appropriately geared to the machine so that each tube is deposited in the pick-up position following the removal of the previous tube therefrom by one of the pairs of jaws 19. The construction of the feed mechanism itself is not relevant to the present invention and has been omitted from the drawings for simplicity. At the pick-up position itself each tube 42 is held with its axis vertical as previously described in a V-shaped recess 53 formed in the side of a tube support member 54 and with its lower end resting on a platform 55. The central part of said support member 54 is cut away as shown in FIGURE 3 to allow clearance for the jaws 19 which are arranged to grip the central region of a said exhaust tube and withdraw it from between the groove in the support member 54 at the open side of the V in the direction indicated by the arrow 56 in FIGURE 4. Each exhaust tube 42 is then carried round the epicyclic path 60 as previously explained until it reaches the transfer position where it is released by the jaws 19 and allowed to fall into the appropriate support 44 of the main conveyor 43.

Similar transfer arrangements to that described with reference to FIGURES 3 and 5 may also be employed for depositing the lamp stems 62 on the support 44 of the main conveyor and also for placing other parts of the lamp, for example filament supports, in predetermined positions on the support with respect to the exhaust tube and lamp stem.

In some cases another group of secondary members in accordance with the invention may be arranged to process the parts of the lamp whilst they are being carried by the main conveyor, for example sealing the parts to each other.

Similarly, another group of secondary members may be adapted to remove the assembled parts from the main conveyor whilst the conveyor is rotating and to transfer them at a position of instantaneous zero velocity to suitable receiving means.

It will be appreciated that machines in accordance with the invention are not restricted to the manufacture of electric lamps, but may readily be designed for use in many other manufacturing processes.

Moreover a secondary member employed for transferring objects in a machine in accordance with the invention may, if desired, be employed for removing the object from a continuously moving main conveyor, bring it to an instantaneous position of zero velocity where a particular operation is carried out on it, accelerate it again and place it on a different continuously moving main conveyor or on a different part of the same conveyor.

Such an arrangement may be required, for example, where a particular operation on an object cannot readily be carried out whilst the object is moving.

I claim:

1. A machine for use in a mass production process comprising a main conveyor including a main article-supporting means, and means for driving the conveyor continuously at a uniform speed, a secondary conveyor adjacent the main conveyor and incorporating at least one bearing mounted on a movable support member and rotatably supporting a carrier member to which is fixed a secondary article-supporting means at a point offset from the bearing axis, driving means for driving the secondary conveyor continuously at a uniform speed for causing the bearing repeatedly to traverse a closed path in a direction perpendicular to the bearing axis, and means for rotating the carrier member continuously about the bearing axis at a uniform angular velocity related to the speed and direction of movement of the bearing around said closed path for causing the secondary article-supporting means repeatedly to follow a working path having at least one cusp position at which the secondary article-support means is instantaneously at rest and at least one other position at which the secondary article-support means is moving in cooperation with and at the same velocity as and adjacent the main article-support means, and means for effecting the transfer of an article from one of said article-support means to the other at said other position.

2. A machine according to claim 1 in which the support member carrying said bearing is mounted for rotation about a fixed axis lying parallel to, but offset from the bearing axis, the driving means is connected to the support member for rotating the latter about said fixed axis at a uniform angular velocity, and the carrier member is associated with means for rotating the carrier member about the bearing axis at an angular velocity related to that of the support member about the fixed axis for causing the article-supporting means to follow an epicyclic path.

3. A machine according to claim 2 in which the secondary conveyor includes a fixed gear wheel and the carrier member consists of a rotatable gear wheel on which the secondary article-supporting means is mounted and which is carried by the support member, the latter being rotatable about the axis of the fixed gear wheel and the rotatable gear wheel being coupled to the fixed gear wheel so as to be driven thereby when the support member is rotated about said axis for causing the secondary article-supporting means to follow an epicylic path.

4. A machine according to claim 3 including a group of rotatable gear wheels each carrying a said secondary article-supporting means and being spaced around and arranged to be driven by the same fixed gear wheel so that each wheel of the group rotates about its own axis as it travels round the fixed gear wheel, and the secondary article-supporting means being so arranged on the corresponding rotatable gear wheels that they all trace out the same epicyclic path.

5. A machine according to claim 1 wherein the main conveyor comprises a support rotatable about a fixed axis, with the main article-supporting means attached to the support at a point offset from the fixed axis, and the machine includes means for rotating the support about said axis at a constant angular velocity for causing the article-supporting means to travel along a circular main path at a uniform speed.

6. A machine according to claim 1 for use in the manufacture of electric incandescent filament lamps, including means for loading component parts of the lamps into the secondary article-supporting means at the cusp position, and means for actuating the secondary article supporting means for causing them to deposit the articles into the said main-article supporting means when the main and secondary article-supporting means are moving at the same velocity as each other.

References Cited in the file of this patent

UNITED STATES PATENTS

| | | |
|---|---|---|
| 281,570 | Severance | July 17, 1883 |
| 374,601 | Knoop | Dec. 13, 1887 |
| 1,654,091 | Peiler | Dec. 27, 1927 |
| 1,928,925 | Brophy | Oct. 3, 1933 |
| 2,154,992 | Pearson | Apr. 18, 1939 |
| 2,524,734 | Pfau | Oct. 3, 1950 |
| 2,578,733 | Nordquist et al. | Dec. 18, 1951 |
| 2,830,712 | Sykokis | Apr. 15, 1958 |